(No Model.)
J. C. JENKINS.
Vehicle Axle and Box.
No. 243,571. Patented June 28, 1881.
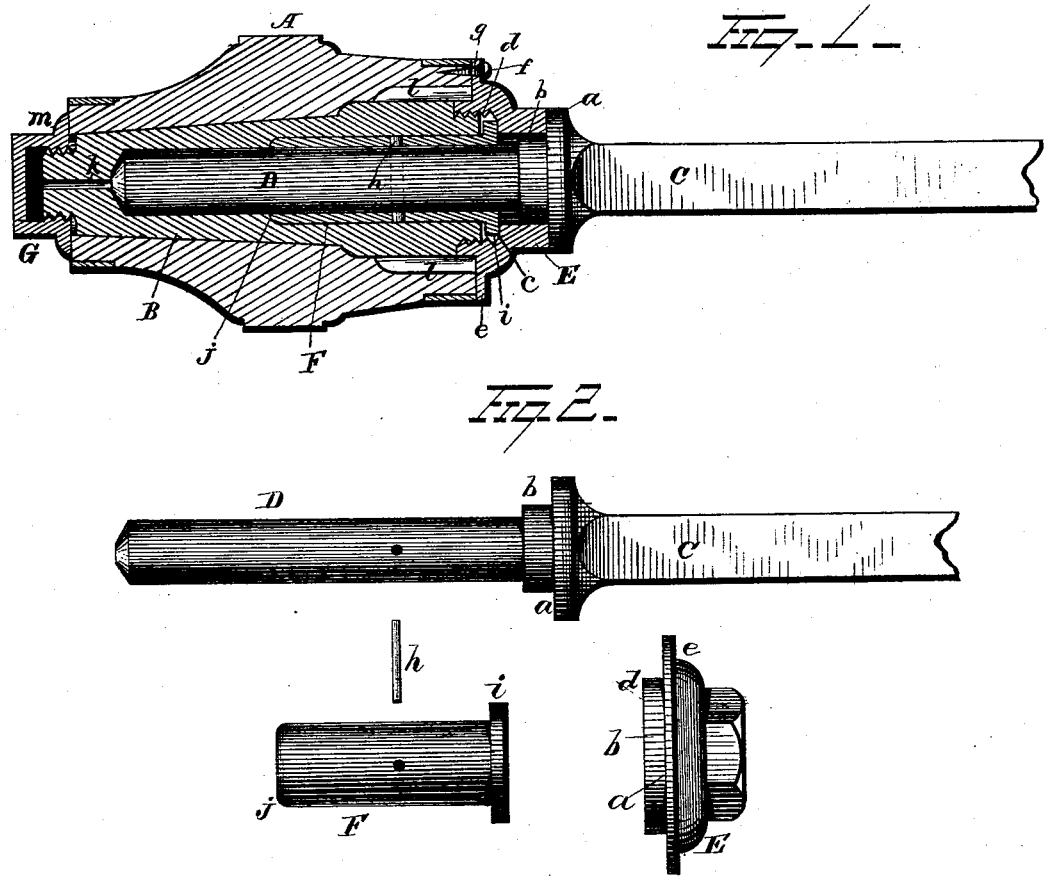
WITNESSES
Herman Moran.
Albert L. Lawrence.
INVENTOR
J. C. Jenkins.
By H. A. Seymour,
ATTORNEY

UNITED STATES PATENT OFFICE.

JOSEPH C. JENKINS, OF BELLAIRE, OHIO, ASSIGNOR OF ONE-HALF TO JAMES C. TALLMAN, OF SAME PLACE.

VEHICLE AXLE AND BOX.

SPECIFICATION forming part of Letters Patent No. 243,571, dated June 28, 1881.

Application filed April 1, 1881. (No model.)

*To all whom it may concern:*

Be it known that I, JOSEPH C. JENKINS, of Bellaire, in the county of Belmont and State of Ohio, have invented certain new and useful Improvements in Vehicle Axles and Boxes; and I do hereby declare the following to be a full, clear, and exact description of the invention, such as will enable others skilled in the art to which it pertains to make and use it, reference being had to the accompanying drawings, which form part of this specification.

My invention relates to certain improvements in the construction of hubs and axles for carriages and other vehicles; and it consists in the novel construction and arrangement of parts, as will be hereinafter more fully set forth, and pointed out in the claims.

In the accompanying drawings, Figure 1 is a longitudinal sectional view of an axle and hub constructed according to my invention, and Fig. 2 is a detail view of the same.

A represents the hub of the wheel, into the bore of which is secured the axle-box B, made longer than the hub, so as to project therefrom at both ends. C is the axle-stock, and D the spindle at the end of the same. At the juncture of the spindle and stock a shoulder, $a$, and step $b$ are formed, against which the shoulder-nut E abuts and has bearing. This nut E is centrally recessed, as shown at $c$, and is provided with a screw-threaded flange, $d$, which fits on the inner end of axle-box B, and, together with the sleeve F, securely holds the axle thereto and prevents the same from working loose. This nut is also provided with an annular rim, $e$, which bears directly against the inner end of the hub, and is secured thereto by screws $f$, which pass through the perforations $g$, formed in the rim $e$ at suitable distances apart. This shoulder-nut above described is simultaneous in its movement with the hub, and serves to exclude all sand and dirt from the axle-box, and prevents the grease from dripping and escaping at this point, and consequently the wear incident to the access of sand or dirt is avoided.

F represents a detachable sleeve fitting over the inner half of the spindle, and secured thereto by a pin, $h$, which passes completely through the sleeve and spindle. This sleeve is provided at its inner end with a flange, $i$, which fits in the recess $c$ in the shoulder-nut, and bears directly against the inner face of the same and securely holds it in position, and, together with the shoulder-nut, prevents the axle from moving endwise in the box. This sleeve F, the periphery of which forms a true circle, can be readily slipped off the spindle by removing the pin $h$, and prevents all friction between the hub-box and spindle, and consequently takes the wear at this point from the spindle. The under side of the sleeve sustains the load, and is the place where the friction is greatest, the wear most, and where the true circle is first destroyed. When the under side of this sleeve is worn and no longer forms a true circle at its point of contact with hub-box, the pin before alluded to can be taken out and the sleeve turned quarter or half way round on the spindle and the pin replaced, and the surface that was formerly at the side or top will be down, and thus there will be again formed a segment of a true circle at the point of contact of the sleeve with the axle-box, which consequently lessens the friction and makes the draft lighter. When the sleeve is worn to such an extent as to render it useless a new one is substituted at a small cost and the axle rendered as good as new.

The outer end of sleeve F is rounded or conical, and is adapted to fit in a horizontal bearing, $j$, formed in the axle-box. This axle-box, as before stated, is a little longer than the hub, and is screw-threaded at both ends, and provided at its outer end with an opening, $k$, for the passage of oil from the reservoir. The axle-box is tapered, and is provided with an enlargement near its inner end, on which the feathers $l$ are secured, which prevent the box from turning in the hub. The hub is bored the proper size to fit this box, and the spindle and removable sleeve exactly conform to the internal shape of the box, and all rattling and vertical and horizontal movement of the axle and sleeve in the box are prevented.

The cap-nut G, which fits on the outer projecting screw-threaded end of the axle-box, is provided with a rim, $m$, which bears directly against the outer end of the hub, preventing the latter from moving endwise on the box.

The recess in this nut is larger than required for the screw-threaded end of the axle-box, and serves also for the reception of oil or grease to lubricate the parts. The opening k in the outer end of the axle-box leads directly into the box, through which the oil passes and lubricates the different parts. The end of the spindle terminates in a rounded or conical end near the outer end of the axle-box, which accurately fits into the axle-box at this point and forms another horizontal bearing, which takes part of the wear from the other parts.

The operation of my improved axle, box, and nuts will be readily understood from the foregoing description without further explanation, and it will be observed that there is but slight wear on the spindle, but that nearly the entire wear is upon the removable and adjustable sleeve and hub-box, which can be replaced at slight cost.

The shoulder-nut E serves the purpose of a bearing, a protection against the ingress of sand, and serves, together with sleeve F, to retain the axle in place and prevent all rattling and noise incident to wagons where the axle is allowed longitudinal movement in the box, and also it protects the spokes and wheel, which are liable to injury when the axle has been worn. The bearings keep the wheel horizontal, and will thus, in connection with the sleeve, keep at all times a true segment of a circle at the point of friction, and thereby greatly reduce the friction and considerably lessen the draft of the vehicle.

Leather washers may be used at all the horizontal bearings, if deemed necessary, or can be used to fill the space when the horizontal bearings become worn.

Having fully described my invention, what I claim as new, and desire to secure by Letters Patent, is—

1. The combination, with the shoulder and step formed at the junction of the axle-stock and spindle, of the sleeve F, axle-box B, hub A, and shoulder-nut E, screw-threaded to connect with the axle-box, and provided with an outwardly-projecting flange, e, which is fastened to the inner end of the hub, substantially as set forth.

2. The combination, with the axle-stock and spindle provided with shoulder a and step b, of the axle-box B, sleeve F, extending partly through the axle-box, hub A, and shoulder-nut E, screwed upon the inner end of the axle-box, said nut provided with outwardly-projecting flange e, which is fastened by screws to the inner end of the axle-hub, substantially as set forth.

In testimony that I claim the foregoing I have hereunto set my hand.

JOSEPH C. JENKINS.

Witnesses:
W. H. BROWN,
F. S. CLINTON.